United States Patent
Higuchi et al.

(10) Patent No.: US 8,289,931 B2
(45) Date of Patent: Oct. 16, 2012

(54) TRANSMITTING DEVICE, RECEIVING DEVICE, AND RANDOM ACCESS CONTROL METHOD

(75) Inventors: Kenichi Higuchi, Yokohama (JP); Yoshihisa Kishiyama, Yokosuka (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 556 days.

(21) Appl. No.: 12/299,272

(22) PCT Filed: Apr. 19, 2007

(86) PCT No.: PCT/JP2007/058538
§ 371 (c)(1),
(2), (4) Date: Jan. 26, 2009

(87) PCT Pub. No.: WO2007/129540
PCT Pub. Date: Nov. 15, 2007

(65) Prior Publication Data
US 2009/0219873 A1 Sep. 3, 2009

(30) Foreign Application Priority Data

May 1, 2006 (JP) .................................. 2006-127994

(51) Int. Cl.
*H04B 7/216* (2006.01)
*H04B 7/208* (2006.01)
*H04B 7/212* (2006.01)
*H04B 7/204* (2006.01)
(52) U.S. Cl. ......... 370/335; 370/320; 370/344; 370/348
(58) Field of Classification Search .................. 370/320, 370/335, 348, 344
See application file for complete search history.

(56) References Cited

U.S. PATENT DOCUMENTS

| 6,535,547 | B1 * | 3/2003 | Lyckegård et al. ........... 375/145 |
| 2002/0114297 | A1 * | 8/2002 | Karna et al. .................. 370/335 |
| 2006/0018336 | A1 * | 1/2006 | Sutivong et al. ............. 370/437 |
| 2006/0126573 | A1 * | 6/2006 | Dick et al. .................... 370/335 |
| 2007/0206531 | A1 * | 9/2007 | Pajukoski et al. ............. 370/329 |
| 2009/0252125 | A1 * | 10/2009 | Vujcic ........................... 370/336 |

FOREIGN PATENT DOCUMENTS

| JP | 11-285048 | 10/1999 |
| JP | 2003-116178 | 4/2003 |
| JP | 2004-297756 A | 10/2004 |
| JP | 2006-54860 | 2/2006 |

OTHER PUBLICATIONS

W-CDMA Mobile Communications System Author: Keiji Tachikawa, Maruzen Co. Ltd. Jun. 25, 2001 (pp. 130-134) Japanese version (3 pages); English translation (6 pages): 9 pages total.
International Search Report (English & Japanese) for PCT/JP2007/058538 mailed Jun. 26, 2007 (8 pages).
Written Opinion of ISA (Japanese) mailed Jun. 26, 2007 (3 pages).

* cited by examiner

*Primary Examiner* — Ricky Ngo
*Assistant Examiner* — Paul H Masur
(74) *Attorney, Agent, or Firm* — Osha Liang LLP

(57) ABSTRACT

A disclosed transmitting device includes a random access channel generating unit configured to generate a random access channel including a preamble that includes at least a part of control information; and a transmission control unit configured to allocate a continuous frequency band or a discontinuous comb-like frequency band set to a user and to transmit the random access channel in a system that flexibly supports multiple bandwidths.

8 Claims, 11 Drawing Sheets

5 MHz  FREQUENCY

ACCESS SLOT
=1.33 msec

TIME

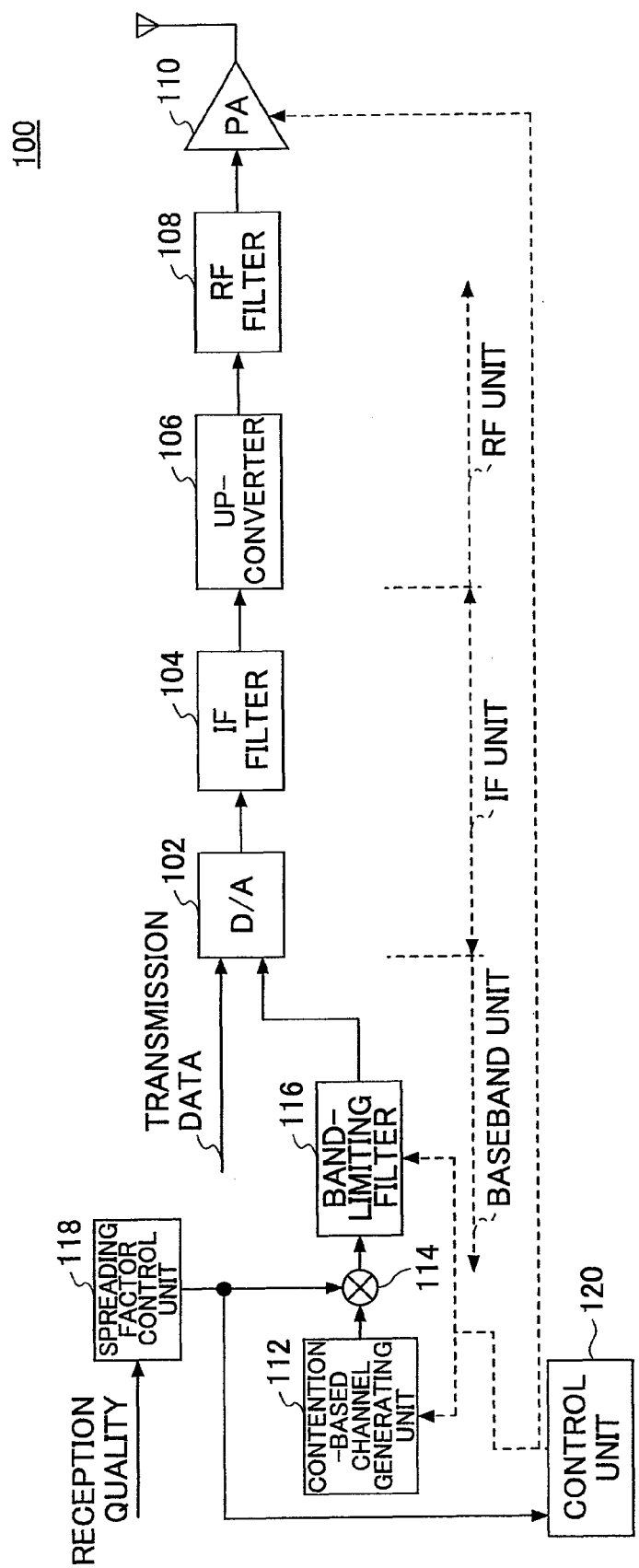

FIG.8

| ACCESS IDENTIFIER = "1" | DOWNLINK CQI | UE ID | SIGNATURE NUMBER |

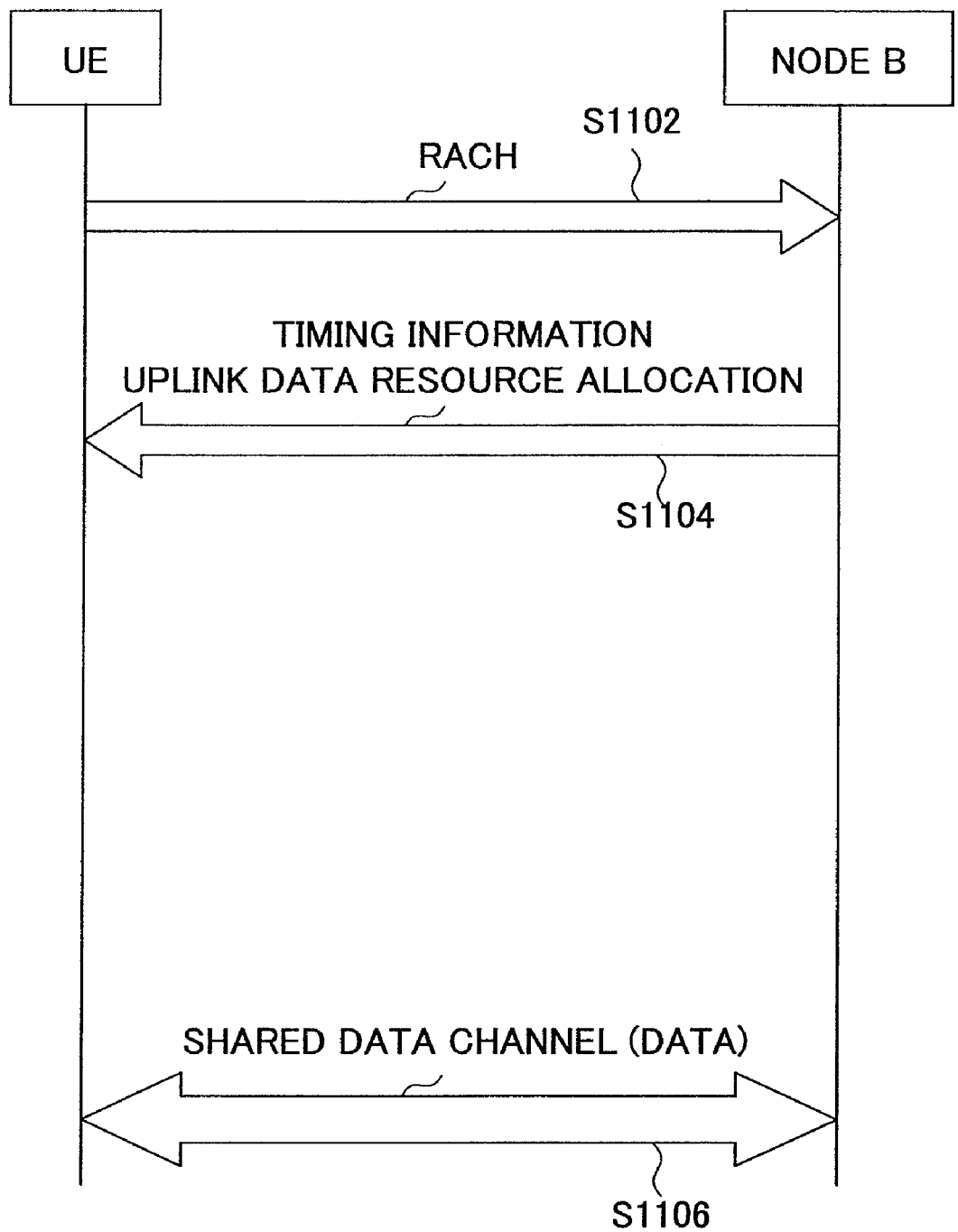

TRANSMITTING DEVICE, RECEIVING DEVICE, AND RANDOM ACCESS CONTROL METHOD

CROSS-REFERENCE TO RELATED APPLICATIONS

The present international application claims priority from Japanese Patent Application No. 2006-127994 filed on May 1, 2006, the entire contents of which are hereby incorporated herein by reference.

TECHNICAL FIELD

The present invention generally relates to a transmitting device, a receiving device, and a random access control method.

BACKGROUND ART

A communication technology called Evolved UTRA (E-UTRA) is being developed as a successor to W-CDMA and HSDPA. E-UTRA is a radio access technology that flexibly supports multiple bandwidths. Specifically, E-UTRA supports bandwidths from 1.25 MHz up to 20 MHz while maintaining compatibility with the existing 3G technology.

In the current W-CDMA, a preamble of a random access channel (RACH), which is a contention-based channel and is used to initially establish an uplink connection, is transmitted within a system by a combination of code division multiplexing and time division multiplexing.

For example, when users are multiplexed by code division multiplexing as shown in FIG. 1A, a terminal can select any signature from multiple signatures (codes) available.

On the other hand, when users are multiplexed by time division multiplexing as shown in FIG. 1B, a terminal can select any access slot from multiple access slots available.

Random access methods in W-CDMA are described, for example, in "W-CDMA Mobile Communication System", Keizo Tachikawa, Maruzen Co. Ltd., June 2001, pp. 130-134.

DISCLOSURE OF INVENTION

Problems to be Solved by the Invention

Meanwhile, an E-UTRA system supports multiple bandwidths, and base stations in an E-UTRA system or E-UTRA systems of different providers support different bandwidths. In other words, available bandwidths differ depending on providers of systems (or differ from cell to cell in a system of a provider). In such an environment, it is necessary to configure mobile stations to be able to connect to base stations using different bandwidths.

Meanwhile, as an uplink radio access scheme for E-UTRA systems, use of the single-carrier localized/distributed FDMA radio access scheme is being discussed.

Generally, a preamble is made of a fairly long sequence so that it is possible to detect a RACH sent even from a cell edge. For example, in W-CDMA, the length of a preamble is 1 ms (4096 chips).

Also, to be able to receive control information even from a cell edge, it is necessary to set a fairly large spreading factor. For example, although it is smaller than a preamble, a spreading factor of about 64 is necessary.

Accordingly, if all control information is to be sent separately from the preamble, an RACH sequence becomes very long and the transmission efficiency is reduced or the number of transmittable control bits is reduced.

One object of the present invention is to solve or reduce one or more of the above problems and to provide a transmitting device, a receiving device, and a random access control method that make it possible to transmit at least a part of control information by a preamble.

Means for Solving the Problems

According to an embodiment of the present invention, a transmitting device includes a random access channel generating unit configured to generate a random access channel including a preamble that includes at least a part of control information; and a transmission control unit configured to allocate a continuous frequency band or a discontinuous comb-like frequency band set within a frequency band allocated for contention-based channels to a user and to transmit the random access channel in a system that flexibly supports multiple bandwidths.

This configuration makes it possible to transmit control information by a preamble.

According to another embodiment of the present invention, a receiving device includes a receiving unit configured to receive a random access channel from a mobile station; and a detecting unit configured to detect a preamble and a control message in the random access channel. When the preamble is divided into multiple blocks and a symbol sequence indicating control information is multiplied by a signature sequence of the blocks, the detecting unit detects signatures of the respective blocks and thereby detects the symbol sequence indicating the control information.

This configuration makes it possible to receive control information transmitted by a preamble.

According to still another embodiment of the present invention, a random access control method includes the steps of generating a random access channel including a preamble that includes at least a part of control information; allocating a continuous frequency band or a discontinuous comb-like frequency band set within a frequency band allocated for contention-based channels to a user; and transmitting the random access channel in a system that flexibly supports multiple bandwidths.

This method makes it possible to transmit control information by a preamble.

Advantageous Effect of the Invention

Embodiments of the present invention provide a transmitting device, a receiving device, and a random access control method that make it possible to transmit at least a part of control information by a preamble.

BRIEF DESCRIPTION OF THE DRAWINGS

FIG. 2 is a partial block diagram illustrating a transmitting device according to an embodiment of the present invention;

FIG. 8 is a drawing illustrating a case where a random access channel is transmitted using a UE-ID;

FIG. 11 is another sequence chart showing operations of a wireless communication system according to an embodiment of the present invention.

EXPLANATION OF REFERENCES

Figure 1A:
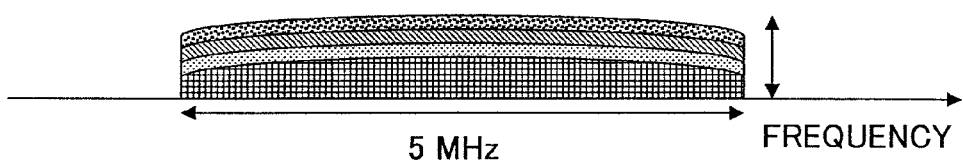
FIG. 1A is a drawing illustrating a method of transmitting a contention-based channel in W-CDMA.
Figure 1B:
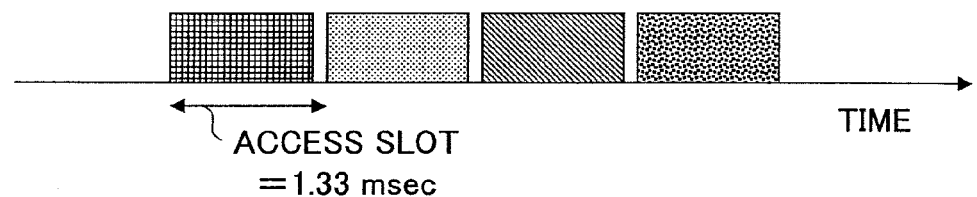
FIG. 1B is a drawing illustrating another method of transmitting a contention-based channel in W-CDMA.

100 Transmitting device
200 Receiving device

BEST MODE FOR CARRYING OUT THE INVENTION

The best mode for carrying out the invention is described based on the following embodiments with reference to the accompanying drawings.

Throughout the accompanying drawings, the same reference numbers are used for parts having the same functions, and overlapping descriptions of those parts are omitted.

A wireless communication system according to an embodiment of the present invention includes a base station and a mobile station.

In the wireless communication system of this embodiment, the single-carrier localized/distributed FDMA radio access scheme is used for uplink. The mobile station transmits a random access channel to perform a random access.

A transmitting device 100 according to an embodiment of the present invention is described below with reference to FIG. 2.

The transmitting device 100 of this embodiment is provided, for example, in a mobile station and uses a random access channel to perform an uplink random access according to the single-carrier localized/distributed FDMA radio access scheme. By the random access channel, a preamble and at least a part of control information are transmitted together.

The transmitting device 100 includes a D/A converter 102 that receives transmission data; an IF filter 104 that receives an output signal from the D/A converter 102; an up-converter 106 that receives an output signal from the IF filter 104; an RF filter 108 that receives an output signal from the up-converter 106; a transmission power amplifier (PA) 110 that receives an output signal from the RF filter 108; a contention-based channel generating unit 112 used as a random access channel generating unit; a multiplier 114 that receives an output signal from the contention-based channel generating unit 112; a band-limiting filter 116 that receives an output signal from the multiplier 114; a control unit 120 used as a transmission control unit for controlling the contention-based channel generating unit 112, the band-limiting filter 116, and the PA 110; and a spreading factor control unit 118 that changes a spreading factor used for a random access channel and provides the spreading factor to the multiplier 114.

A baseband-processed random access channel is input to the D/A converter 102 of an IF unit and passes through the IF filter 104. An output signal from the IF filter 104 is input to the up-converter 106 of an RF unit and is converted into a radio frequency corresponding to a determined uplink transmission frequency band. A part of this function may be incorporated in a baseband unit. The converted signal passes through the RF filter 108.

An output signal from the RF filter 108 is amplified by the PA 110. For example, open-loop transmission power control is performed by the PA 110. In the open-loop transmission power control, transmission power of a random access channel is determined based on the received power of a downlink pilot channel. The amplified transmission signal is transmitted from a transmitting antenna.

The contention-based channel generating unit 112 generates a contention-based channel, e.g., a random access channel (RACH), and inputs the generated channel to the multiplier 114.

Information to be transmitted by a random access channel is described below.

The transmitting device 100 of this embodiment transmits one or more of a signature, a user ID, a downlink channel quality indicator, scheduling request information, an access identifier, and a cyclic redundancy check (CRC) by a random access channel.

The signature is used to identify the random access channel of a user and is transmitted as a part of a preamble. The base station performs timing synchronization using the signature. In W-CDMA, 16 types of signatures are provided.

The user ID is represented by a random temporary ID or a UE-ID. The random temporary ID is used before a UE-ID is assigned by a serving cell, i.e., when the mobile station is in an idle state. Once a UE-ID is assigned by a serving cell, the mobile station uses the UE-ID to transmit a random access channel. For example, the user ID requires about 10 to 14 bits.

The downlink channel quality indicator (CQI) is used in link adaptation, such as transmission power control and AMC, for a downlink feedback channel to be sent in response to the random access channel. In other words, the downlink CQI is used for the initial scheduling. For example, the downlink CQI requires about 2 to 8 bits.

The scheduling request information includes, for example, a link type indicating uplink or downlink, a data size, and QoS information such as a maximum error rate and maximum delay. For example, the scheduling request information requires about 1 to 8 bits.

The access identifier, for example, indicates either a random access in an idle state or a random access in an active state. For example, the access identifier requires about 1 to 2 bits.

The CRC is used to detect errors in random access control information. For example, the CRC requires about 12 bits.

Figure 3A:
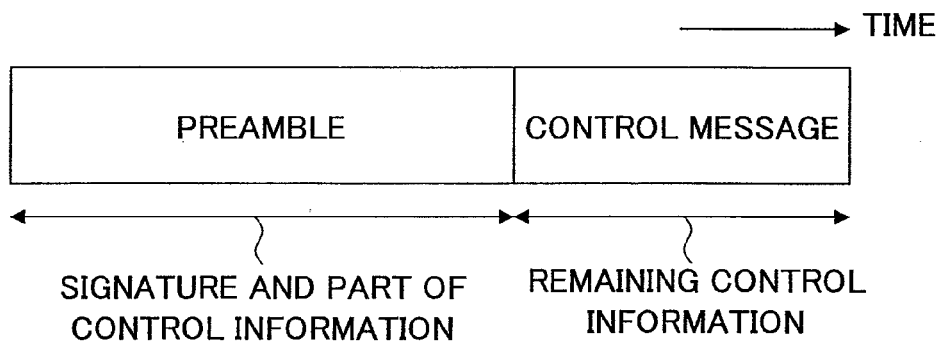
FIG. 3A is a drawing illustrating a method of transmitting control information according to an embodiment of the present invention.

As shown in FIG. 3A, a random access channel to be transmitted by the transmitting device 100 of this embodiment includes a preamble and a control message. The preamble includes a signature and a part of control information, and the control message includes the remaining part of the control information.

With this random access channel configuration, the preamble and the control message are transmitted consecutively as one burst.

Transmitting the preamble and the control message consecutively, in other words, transmitting the control message together with the preamble makes it possible to reduce time necessary to establish an uplink connection and thereby to reduce delay. This in turn makes it possible to reduce delay involved in the transmission of traffic data by a shared data channel that follows the random access channel.

Figure 3B:
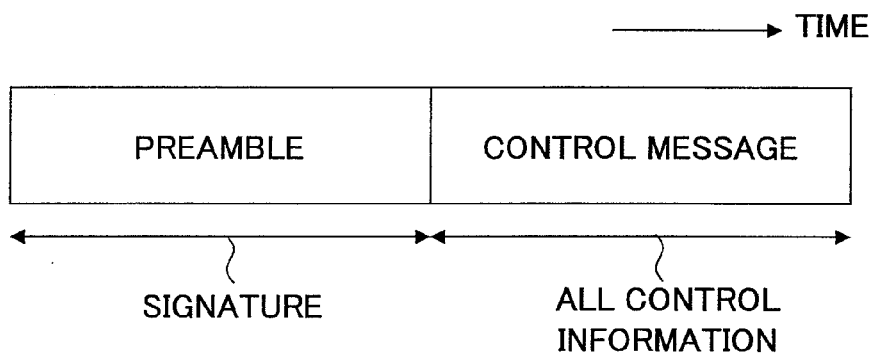
FIG. 3B is a drawing illustrating another method of transmitting control information according to an embodiment of the present invention.

FIG. 3B shows another exemplary configuration of a random access channel where a signature is included in the preamble and all control information is included in the control message. With this random access channel configuration, the preamble and the control message are transmitted consecutively as one burst.

Figure 3C:
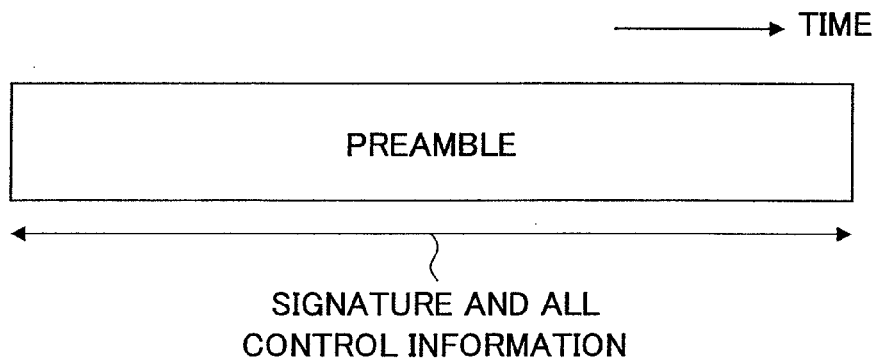
FIG. 3C is a drawing illustrating still another method of transmitting control information according to an embodiment of the present invention.

FIG. 3C shows still another exemplary configuration of a random access channel where a signature and all control information are included in the preamble. This configuration makes it possible to eliminate the control message.

The preamble of a random access channel is used to initially establish an uplink connection and includes a signature used to identify and detect the random access channel.

Based on the preamble, a receiving device (base station) measures a reception timing used for uplink transmission timing control and identifies a carrier frequency in a multi-bandwidth system. The preamble is also used as a reference symbol to obtain a channel estimate used for demodulation of the control message.

Generally, even if multiple mobile stations transmit uplink signals at the same time to a base station, the signals are received at different timings by the base station depending on the locations of the mobile stations. In the single-carrier localized/distributed FDMA, transmission timings are controlled such that multiple uplink signals are received within a cyclic prefix. This makes it possible to achieve orthogonality in the frequency domain between user signals in the same subframe.

Transmission timing control is also necessary to allocate radio resources orthogonal to each other in the time domain by packet scheduling.

For these purposes, the base station measures reception timings based on random access channels transmitted initially to establish uplink connections and performs transmission timing control based on the measured reception timings.

Meanwhile, in a multi-bandwidth system, a mobile station can select any frequency band from available frequency bands and perform a random access using the selected frequency band. The base station identifies the carrier frequency selected by the mobile station. For example, mobile stations select frequency bands in a random manner.

Control information in a random access channel includes information described above used to establish a connection and reservation information necessary to transmit data by a shared data channel that follows the random access channel. The transmitting device 100 of this embodiment transmits minimum information necessary to establish an uplink connection by a random access channel and transmits traffic data and upper layer control information by a shared data channel that follows.

Control information used to establish a connection includes a user ID, for example, a temporary user ID (random temporary ID) used by the mobile station for random access. Reservation information necessary to transmit data by a shared data channel includes a data size; QoS information of data such as a maximum error rate, maximum delay, and a special call type (e.g., emergency call); and capability of the mobile station (UE capability) such as a supported bandwidth, supported maximum transmission power, and the number of transmitting antennas.

The multiplier 114 spreads a signal with a spreading code determined by the spreading factor control unit 118 to generate a broadband signal and inputs the broadband signal into the band-limiting filter 116.

The spreading factor control unit 118 changes the spreading factor used for a random access channel according to information indicating reception conditions, i.e., information indicating average reception quality of the mobile station. More specifically, the spreading factor control unit 118 selects a spreading factor based on the reception quality from multiple spreading factors provided for random access channels. For example, the spreading factor control unit 118 selects a large spreading factor when the reception quality is poor and selects a small spreading factor when the reception quality is good. In short, the spreading factor control unit 118 performs variable spreading factor control. The spreading factor control unit 118 controls the spreading factor for at least one of the preamble and the control message. After selecting a spreading factor, the spreading factor control unit 118 inputs the selected spreading factor to the control unit 120.

The control unit 120 selects a frequency band for the preamble and the L1/L2 control message within an entire frequency band allocated for random access channels. More specifically, the control unit 120 selects a continuous frequency band from available continuous frequency bands (localized FDMA) or selects a comb-like frequency band set from available comb-like frequency band sets (distributed FDMA). For example, the control unit 120 selects a continuous frequency band of 1.25 MHz obtained by dividing an allocated frequency band of 5 MHz into four. As another example, the control unit 120 selects a continuous frequency band of 1.25 MHz obtained by dividing an allocated frequency band of 2.5 MHz into two.

As still another example, the control unit 120 selects a comb-like frequency band set from four comb-like frequency band sets arranged in an allocated frequency band of 5 MHz. In this case, comb-like sub-bands appearing every 1.25 MHz in the 5 MHz frequency band are allocated for the preamble and the L1/L2 control message.

The control unit 120 may also be configured to select a frequency band and a comb-like frequency band set for the preamble and the L1/L2 control message by a combination of the localized FDMA method and the distributed FDMA method. Also, the control unit 120 may be configured to select a frequency band by a combination of the localized and distributed FDMA methods, code division multiplexing, and time division (access slot) multiplexing.

Further, in a case where the transmission power and the spreading factor for a random access channel are adjusted according to average reception quality of the mobile station, the control unit 120 may be configured to change the burst length for the random access channel. If the spreading factor is increased without changing the burst length, the achievable data rate decreases and the number of control bits transmittable by the L1/L2 control message decreases. As a result, it becomes impossible to transmit a required number of control bits. To obviate this problem, the control unit 120 changes the burst length for a random access channel according to the result of variable spreading factor control described above.

Based on a spreading factor input from the spreading factor control unit 118, the control unit 120 controls the length of the L1/L2 control message in a random access channel. For example, the control unit 120 increases the length of the L1/L2 control message if the spreading factor is large and decreases the length of the L1/L2 control message if the spreading factor is small. Here, it is possible to simplify the processing at the receiving device by determining the correspondence between spreading factors and lengths of the L1/L2 control message in advance.

The control unit 120 may also be configured to change the length of the preamble in addition to the length of the L1/L2 control message according to the spreading factor.

Next, a process of generating a random access channel by the contention-based channel generating unit 112 is described. In this embodiment, it is assumed that 16 types of signatures are provided. However, the process described below may also be applied to a case where a different number of signatures are provided.

Figure 4:
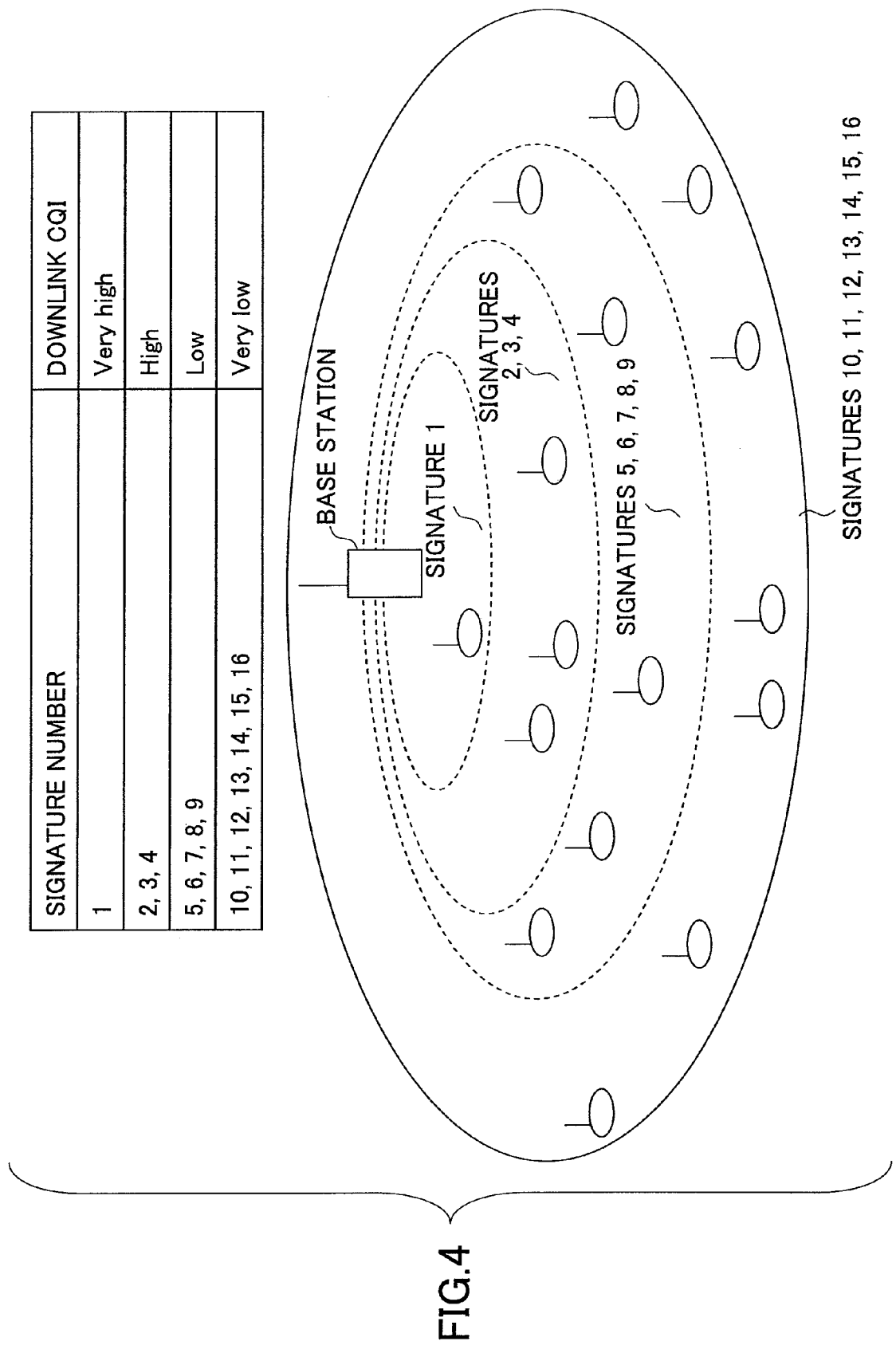
FIG. 4 is a drawing illustrating an exemplary method of associating signatures with control information.

As shown in FIG. 4, the contention-based channel generating unit 112 has a set of signature numbers that are grouped in advance based on downlink CQIs of users. For example, mobile stations are categorized into "very high", "high", "low", and "very low" groups based on their downlink CQIs; and signature number 1 is associated with the "very high" group, signature numbers 2, 3, and 4 are associated with the "high" group, signature numbers 5, 6, 7, 8, and 9 are associated with the "low" group, and signature numbers 10, 11, 12, 13, 14, 15 and 16 are associated with the "very low" group.

The contention-based channel generating unit 112 determines to which one of the "very high", "high", "low", and "very low" groups the mobile station belongs based on its downlink CQI and selects one of the signature numbers associated with the determined group.

In this example, mobile stations are categorized into groups based on downlink CQIs and signature numbers associated with the corresponding groups are assigned to the respective mobile stations. Alternatively, mobile stations may be categorized into groups based on distances of the mobile stations from the base station (receiving device) and signature numbers associated with the corresponding groups may be assigned to the respective mobile stations.

This method makes it possible for the receiving device to obtain downlink channel quality of mobile stations based on signature numbers. This in turn eliminates the need for the transmitting device 100 to report downlink channel quality using control bits and thereby makes it possible to reduce control information.

Figure 5:
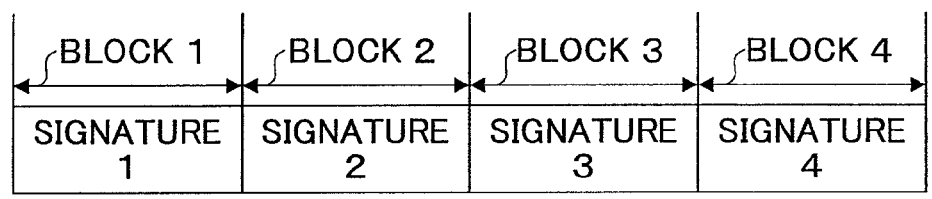
FIG. 5 is a drawing illustrating another exemplary method of associating signatures with control information.

Meanwhile, to increase the number of control bits transmittable by the preamble, it is necessary to increase the number of signature types. However, simply increasing the number of signature types increases the workload of a receiving device for correlation detection. To solve or reduce this problem, the contention-based channel generating unit 112 may be configured to divide the preamble into multiple blocks and to generate different signatures for the respective blocks. For example, as shown in FIG. 5, the contention-based channel generating unit 112 divides the preamble into four blocks (block1, block 2, block 3, and block 4) and assigns different signatures, each selected from 16 types of signatures, to the respective blocks. The receiving device detects control information based on the combination of signatures assigned to the blocks. When the number of blocks is four and 16 types of signatures are used for each block, the number of possible combinations is $16^4$ (=65,536).

In this case, the receiving device detects signatures of the blocks each selected from 16 types of signatures and also calculates the sum of correlation detection values of the blocks.

Here, if all combinations are allowed, it becomes difficult to distinguish random access channels of contending users. Therefore, usable combinations are limited. Limited combinations of signatures that are weakly correlated with each other can be generated by using the Reed-Solomon code. The Reed-Solomon code is used to generate code patterns for downlink S-SCHs in W-CDMA. In W-CDMA, 64 codes composed of four sets of 16 cyclically-shifted codes are generated using the Reed-Solomon code.

Figure 6:
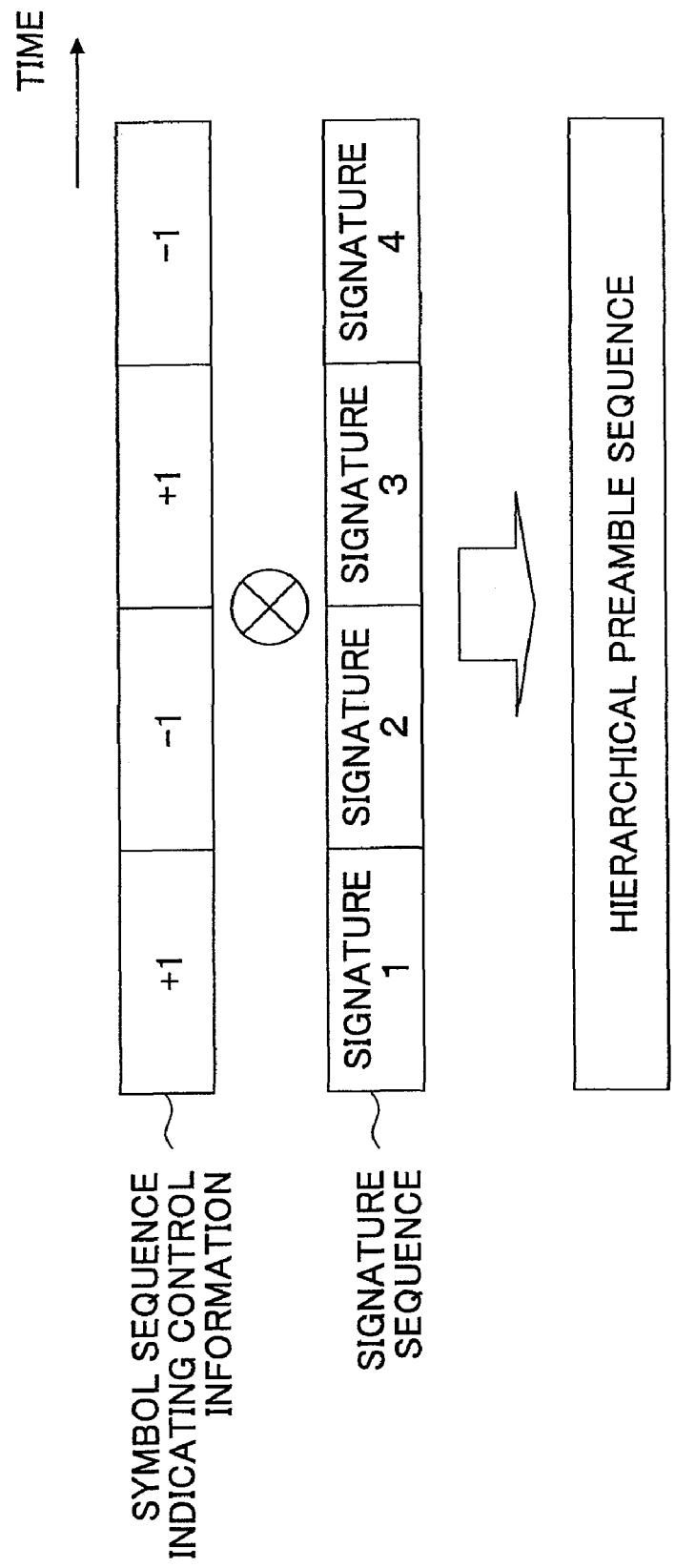
FIG. 6 is a drawing illustrating a transmission method where a sequence indicating control information is multiplied by a signature sequence.

The contention-based channel generating unit 112 may be configured to multiply a sequence indicating control information by a signature sequence. For example, as shown in FIG. 6, the contention-based channel generating unit 112 multiplies a symbol sequence indicating control information including +1, −1, +1, and −1 by a signature sequence including signature 1, signature 2, signature 3, and signature 4, and thereby generates a hierarchical preamble sequence.

As the symbol sequence indicating control information, an orthogonal sequence such as a Walsh sequence or a GCL sequence is used. Using an orthogonal sequence achieves orthogonality (zero cross-correlation) and thereby makes it possible to improve detection accuracy. For example, a Walsh sequence can be easily detected by Hadamard conversion and a GCL sequence can be easily detected by DFT conversion.

Alternatively, a random modulation sequence may be used. Using a random modulation sequence makes it possible to increase the number of transmittable bits.

Also, a coded sequence may be used. For example, a channel coded sequence, such as a convolution coded sequence, of control information may be used. In this case, if the number of blocks of the preamble is small, the coding gain is not achieved. However, if the number of blocks is large enough, it is possible to increase the number of transmittable bits and to improve the detection accuracy by the coding gain.

Meanwhile, the receiving device first detects the signatures of the respective blocks, and then detects the symbol sequence indicating the control information. This configuration makes it possible to detect signatures and a symbol sequence by a simple process. Alternatively, the receiving device may be configured to detect the signatures of the respective blocks and the symbol sequence at once. This configuration makes it possible to improve detection accuracy.

Figure 7:
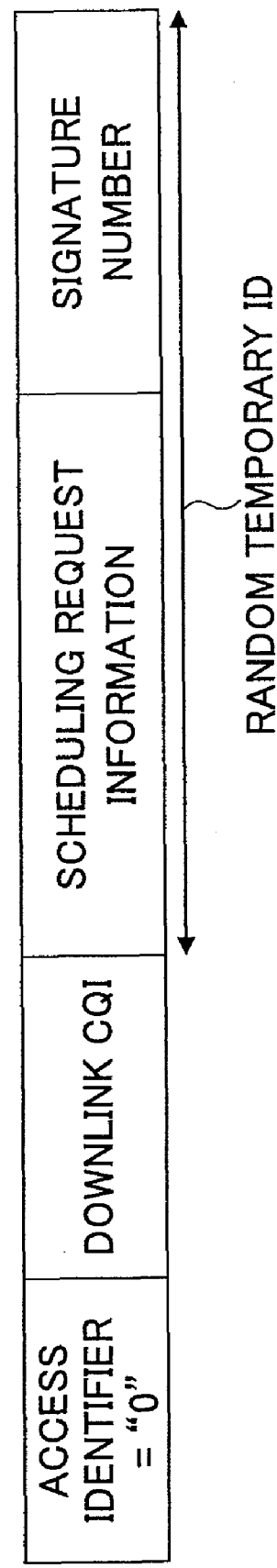
FIG. 7 is a drawing illustrating a case where a random access channel is transmitted using a random temporary ID.

The contention-based channel generating unit 112 may be configured to reduce the number of control bits. The contention-based channel generating unit 112 uses a combination of control bits as a random temporary ID. For example, as shown in FIG. 7, when transmitting a random access channel using a random temporary ID (initial access), the contention-based channel generating unit 112 generates an access identifier, a downlink CQI, scheduling request information, and a signature number as control information. The contention-based channel generating unit 112 uses a sequence composed of the scheduling request information and the signature number as a random temporary ID. In this case, the access identifier is set at 0 to indicate that a random temporary ID is used and the current access is a random access in the idle state.

On the other hand, when transmitting a random access channel using a UE-ID after loss of synchronization or handover, the contention-based channel generating unit 112 generates an access identifier, a downlink CQI, and a UE-ID as control information as shown in FIG. 8. The contention-based channel generating unit 112 also determines a signature number based on the UE-ID and includes the signature number in the UE-ID. In this case, the access identifier is set at 1 to indicate that the current access is a random access in the active state. When transmitting a random access channel using a UE-ID, it is assumed that the scheduling request information has already been sent.

With this configuration, the receiving device can determine, based on the access identifier, whether the control information is in a format using a random temporary ID or a format using a UE-ID. Also, the above configuration eliminates the need to transmit a random temporary ID using separate bits. Further, the above configuration makes it possible to transmit control information including a random temporary ID using the same number of control bits as that necessary to transmit control information including a UD-ID.

Figure 9:
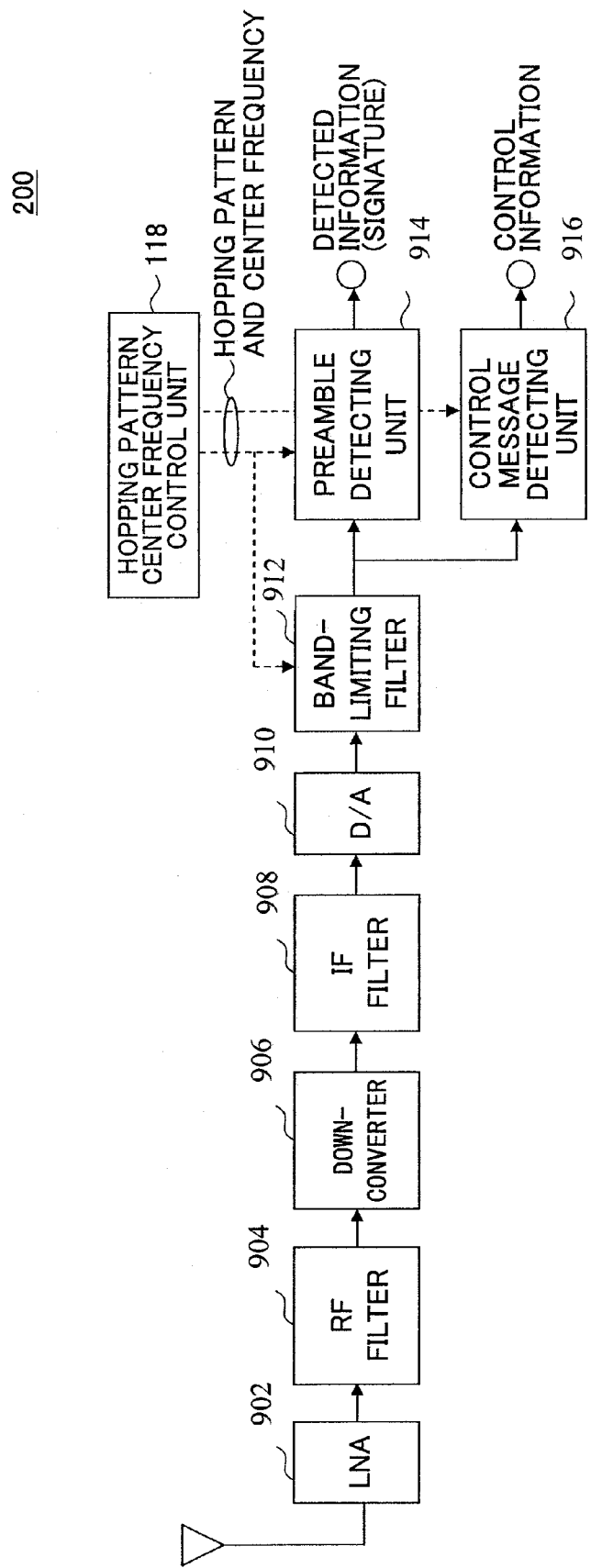
FIG. 9 is a partial block diagram illustrating a receiving device according to an embodiment of the present invention.

A receiving device 200 according to an embodiment of the present invention is described below with reference to FIG. 9.

The receiving unit 200 of this embodiment is provided, for example, in a base station. The receiving unit 200 includes a low noise amplifier (LNA) 902 equipped with an antenna; an RF filter 904 that receives an output signal from the LNA 902; a down-converter 906 that receives an output signal from the RF filter 904; an IF filter 908 that receives an output signal from the down-converter 906; a D/A converter 910 that receives an output signal from the IF filter 908; a band-limiting filter 912 that receives an output signal from the D/A converter 910; a preamble detecting unit 914 and a control message detecting unit 916 that are collectively used as a detection unit and receive an output signal from the band-limiting filter 912; and a hopping pattern center frequency control unit 118 used as a control unit for controlling the band-limiting filter 912, the preamble detecting unit 914, and the control message detecting unit 916.

The LNA 902 amplifies a received signal to suit processing and inputs the amplified signal to the down-converter 906. The down-converter 906 generates a signal with an intermediate frequency (IF) from the amplified signal and inputs the IF signal to the IF filter 908. The IF filter 908 limits the IF signal within a specific frequency band of the received signal. The limited signal is input to the D/A converter 910 and is band-limited by the band-limiting filter 912. Then, the band-limited signal is input to the preamble detecting unit 914 and the L1/L2 control message detecting unit 916.

The hopping pattern center frequency control unit 118 controls the band-limiting filter 912, the preamble detecting unit 914, and the control message detecting unit 916 based on a hopping pattern and a center frequency used by the base station for random access channels.

The preamble detecting unit 914 detects the preamble and outputs the detected information (signature). The control message detecting unit 916 detects the control message and outputs control information.

The preamble detecting unit 914 detects the preamble of a received random access channel and demodulates the preamble. Each mobile station selects one of multiple codes available and transmits a random access channel using the selected code. When signatures and control information are associated, the preamble detecting unit 914 obtains control information based on the demodulated preamble and inputs the obtained control information to the control message detecting unit 916.

When the preamble is divided into multiple blocks and different signatures are assigned to the respective blocks (e.g., a signature selected from 16 types of signatures is assigned to each block), the preamble detecting unit 914 detects signatures assigned to the blocks and calculates the sum of correlation detection values of the blocks. This configuration makes it possible to detect a large number of control bits transmitted by the preamble.

When a symbol sequence indicating control information is multiplied by a signature sequence, the preamble detecting unit 914 detects signatures of the respective blocks and thereby detects the symbol sequence indicating the control information. The preamble detecting unit 914 inputs the detected control information to the control message detecting unit 916. This configuration makes it possible to easily detect a preamble and control information.

Alternatively, the preamble detecting unit 914 may be configured to detect signatures of blocks and a symbol sequence indicating control information at once. The preamble detecting unit 914 inputs the detected control information to the control message detecting unit 916. This configuration makes it possible to improve detection accuracy.

Next, operations of a wireless communication system of this embodiment are described.

Figure 10:
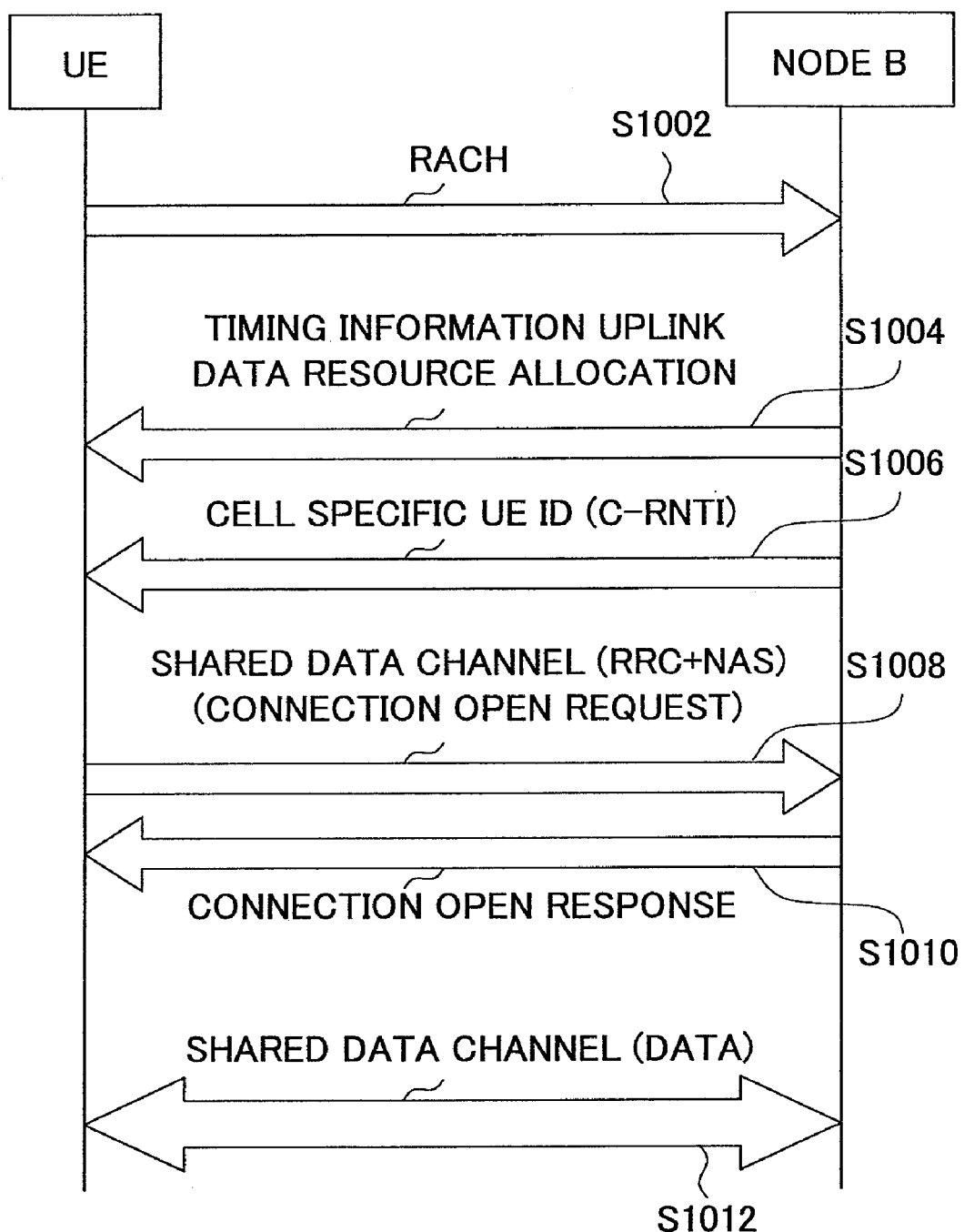
FIG. 10 is a sequence chart showing operations of a wireless communication system according to an embodiment of the present invention.

FIG. 10 shows a transition process from an idle state to an active state.

In FIG. 10, the mobile station (UE) transmits a random access channel (RACH) to the base station (node B) (step S1002). For example, the mobile station transmits a RACH using a random temporary ID.

The base station transmits uplink data resource allocation information and timing information to the mobile station (step S1004).

Next, the base station transmits a cell specific UE-ID (C-RNTI) to the mobile station (step S1006).

Then, the mobile station transmits a shared data channel to the base station (step S1008). Specifically, the mobile station transmits RRC+NAS to make a connection open request.

The base station transmits a connection open response to the mobile station (S1010).

Then, the mobile station and the base station transmit and receive data via shared data channels (S1012).

FIG. 11 shows a transition process from a dormant state to an active state or a handover state.

In FIG. 11, the mobile station transmits a random access channel (RACH) to the base station (step S1102). For example, the mobile station transmits a RACH using a UE-ID.

The base station transmits uplink data resource allocation information and timing information to the mobile station (step S1104).

Then, the mobile station and the base station transmit and receive data via shared data channels (step S1106).

INDUSTRIAL APPLICABILITY

A transmitting device, a receiving device, and a random access control method according to embodiments of the present invention may be applied to a wireless communication system.

The invention claimed is:

1. A transmitting device, comprising:
   a random access channel generating unit for generating a random access channel comprising a preamble including a part of control information and a control message including a remaining part of the control information; and
   a transmission control unit for allocating a continuous frequency band or a discontinuous comb-like frequency band set within a frequency band allocated for contention-based channels to a user and to transmit the random access channel in a system that flexibly supports multiple bandwidths.

2. The transmitting device as claimed in claim 1, wherein the preamble includes a signature number;
   multiple signature numbers are categorized in advance into groups indicating different levels of channel quality; and
   the random access channel generating unit is configured to select the signature number from one of the groups corresponding to a CQI of the transmitting device so that the signature number indicates the channel quality of the transmitting device.

3. The transmitting device as claimed in claim 1, wherein the random access channel generating unit is configured to divide the preamble into multiple blocks and to generate signatures for the respective blocks such that a combination of the signatures indicates the part of the control information.

4. The transmitting device as claimed in claim 1, wherein the random access channel generating unit is configured to divide the preamble into multiple blocks including a symbol sequence indicating the part of the control information, to generate signatures for the respective blocks, and to multiply the symbol sequence by the signatures.

5. The transmitting device as claimed in claim 1, wherein the random access channel generating unit is configured to generate the random access channel including an access identifier, a downlink CQI, scheduling request information, and a signature number, the scheduling request information and the signature number representing a temporary ID used for random access.

6. The transmitting device as claimed in claim 1, wherein the random access channel generating unit is configured to generate the random access channel including an access identifier, a downlink CQI, and a user ID and to determine a signature based on the user ID.

7. A receiving device, comprising:
  a receiving unit for receiving a random access channel from a mobile station; and
  a detecting unit for detecting a preamble including a part of control information and a control message including a remaining part of the control information in the random access channel;
  wherein when the preamble is divided into multiple blocks including a symbol sequence indicating the part of the control information and the symbol sequence is multiplied by signatures of the blocks, the detecting unit is configured to detect the signatures of the blocks and thereby to detect the symbol sequence indicating the part of the control information.

8. A random access control method, comprising the steps of:
  a step for generating a random access channel comprising a preamble including a part of control information and a control message including a remaining part of the control information;
  a step for allocating a continuous frequency band or a discontinuous comb-like frequency band set within a frequency band allocated for contention-based channels to a user; and
  a step for transmitting the random access channel in a system that flexibly supports multiple bandwidths,
  wherein the random access channel is generated by a random access channel generating unit, and
  wherein a transmission control unit allocates the continuous frequency band or the discontinuous comb-like frequency band set and transmits the random access channel.

* * * * *